US012638090B2

(12) United States Patent
Otremba

(10) Patent No.: US 12,638,090 B2
(45) Date of Patent: May 26, 2026

(54) DOUBLE CHECK VALVE, PNEUMATIC BRAKING DEVICE, AND VEHICLE

(71) Applicant: ZF CV Systems Global GmbH, Bern (CH)

(72) Inventor: Robert Otremba, Ronnenberg (DE)

(73) Assignee: ZF CV Systems Global GmbH, Bern (CH)

( * ) Notice: Subject to any disclaimer, the term of this patent is extended or adjusted under 35 U.S.C. 154(b) by 13 days.

(21) Appl. No.: 18/125,884

(22) Filed: Mar. 24, 2023

(65) Prior Publication Data

US 2023/0313893 A1 Oct. 5, 2023

(30) Foreign Application Priority Data

Apr. 1, 2022 (DE) ..................... 10 2022 107 781.0

(51) Int. Cl.
| | |
|---|---|
| *F16K 11/10* | (2006.01) |
| *B60T 15/02* | (2006.01) |
| *F16K 11/24* | (2006.01) |
| *F16K 31/06* | (2006.01) |
| *F16K 31/08* | (2006.01) |

(52) U.S. Cl.
CPC .......... *F16K 11/105* (2013.01); *B60T 15/027* (2013.01); *F16K 11/24* (2013.01); *F16K 31/0627* (2013.01); *F16K 31/084* (2013.01)

(58) Field of Classification Search
CPC .. F16K 11/105; F16K 31/0627; F16K 31/082;

F16K 31/084; F16K 11/24; B60T 15/027; B60T 15/041; B60T 11/326; Y10T 137/2567; Y10T 137/7838
See application file for complete search history.

(56) References Cited

U.S. PATENT DOCUMENTS

| | | | | |
|---|---|---|---|---|
| 1,824,013 | A | * | 9/1931 | Fitch ..................... B60T 15/048 303/41 |
| 2,159,687 | A | * | 5/1939 | Campbell ............. B60T 15/048 303/64 |
| 2,501,755 | A | * | 3/1950 | Bent ...................... F16K 15/04 137/516.25 |

(Continued)

FOREIGN PATENT DOCUMENTS

| | | |
|---|---|---|
| DE | 19642937 A1 | 4/1997 |
| DE | 102017006545 A1 | 1/2019 |

(Continued)

*Primary Examiner* — Reinaldo Sanchez-Medina
(74) *Attorney, Agent, or Firm* — Dickinson Wright PLLC

(57) ABSTRACT

A double check valve (100) includes a sleeve (10) with a first inlet opening (11), a second inlet opening (12), an outlet opening (13), and a guide piece (20). The guide piece (20) movable along the longitudinal axis (L) within the sleeve (10), by loading with a fluid-induced pressure, between a first blocking position (S1) and a second blocking position (S2) spaced therefrom, wherein each of the inlet openings (11, 12) is closed at least partly fluid-tightly by the guide piece (20) in one of the blocking positions (S1, S2). The double check valve (100) has a permanent magnet (30, 31, 32, 33), and the guide piece (20) and the permanent magnet (30, 31, 32, 33) are configured to magnetically deflect the guide piece (20) from an intermediate position (Z) arranged between the blocking positions (S1, S2) and/or from one of the two blocking positions (S1, S2).

15 Claims, 3 Drawing Sheets

(56) References Cited

U.S. PATENT DOCUMENTS

| | | | | | |
|---|---|---|---|---|---|
| 2,811,979 | A | * | 11/1957 | Presnell | F16K 11/044 251/332 |
| 3,178,151 | A | * | 4/1965 | Caldwell | H01F 7/1615 335/229 |
| 3,203,447 | A | * | 8/1965 | Bremner | F16K 31/0627 335/229 |
| 3,447,556 | A | * | 6/1969 | Howeth | F16K 11/056 60/431 |
| 3,552,437 | A | * | 1/1971 | Blosser, Jr. | F16K 31/02 235/201 ME |
| 3,624,752 | A | * | 11/1971 | Schmidt | F15C 3/02 137/625.49 |
| 3,728,654 | A | * | 4/1973 | Tada | H01F 7/1615 335/254 |
| 3,754,154 | A | * | 8/1973 | Massie | H02K 33/14 310/34 |
| 3,809,123 | A | * | 5/1974 | Heimann | F16K 31/082 137/625.5 |
| 3,900,230 | A | * | 8/1975 | Durling | B60T 11/326 128/205.15 |
| 4,306,589 | A | * | 12/1981 | Harned | H01F 7/08 137/625.5 |
| 4,422,060 | A | * | 12/1983 | Matsumoto | H01F 7/13 335/266 |
| 4,682,629 | A | * | 7/1987 | Deininger | F16K 31/0679 251/129.08 |
| 4,744,543 | A | * | 5/1988 | Renheim | F16K 31/082 251/129.21 |
| 4,751,487 | A | * | 6/1988 | Green, Jr. | H01F 7/1615 335/79 |
| 5,106,274 | A | * | 4/1992 | Holtzapple | F04B 17/042 417/418 |
| 5,203,172 | A | * | 4/1993 | Simpson | F15B 11/042 417/418 |
| 5,734,310 | A | * | 3/1998 | Ankney | H01F 7/121 335/255 |
| 6,446,656 | B1 | * | 9/2002 | Franks | F16K 11/056 137/112 |
| 6,837,257 | B2 | * | 1/2005 | Cedergren | F16K 31/08 137/907 |
| 7,011,076 | B1 | * | 3/2006 | Weldon | F02M 25/0836 251/129.09 |
| 7,573,361 | B2 | * | 8/2009 | Sakurai | H01F 7/1615 335/207 |
| 7,717,396 | B2 | * | 5/2010 | Graffin | F16K 31/086 251/65 |
| 8,297,714 | B2 | * | 10/2012 | Bensch | B60T 13/683 303/7 |
| 8,579,250 | B1 | * | 11/2013 | Theobald | F16K 31/0613 251/129.09 |
| 9,478,339 | B2 | * | 10/2016 | Gilmore | H01F 7/1615 |
| 9,899,132 | B2 | * | 2/2018 | Gilmore | H01F 7/1615 |
| 10,024,453 | B2 | * | 7/2018 | Robertson | F16K 11/24 |
| 11,268,628 | B2 | * | 3/2022 | Ito | F16K 47/023 |
| 2009/0309413 | A1 | | 12/2009 | Bensch et al. | |
| 2011/0107864 | A1 | * | 5/2011 | Bai | F16H 61/28 74/473.12 |
| 2015/0035350 | A1 | * | 2/2015 | Darner | B60T 11/28 303/6.01 |
| 2017/0057805 | A1 | * | 3/2017 | Bischel | A23G 9/228 |
| 2020/0355279 | A1 | * | 11/2020 | Knipper | F16K 31/423 |
| 2021/0246994 | A1 | * | 8/2021 | Lanigan | F16K 31/082 |
| 2021/0300311 | A1 | * | 9/2021 | Brütt | B60T 13/683 |
| 2021/0316705 | A1 | * | 10/2021 | Laskawy | B60T 13/263 |

FOREIGN PATENT DOCUMENTS

| | | |
|---|---|---|
| DE | 202021105880 U1 | 7/2022 |
| KR | 20040088445 A | 10/2004 |

* cited by examiner

DOUBLE CHECK VALVE, PNEUMATIC BRAKING DEVICE, AND VEHICLE

FIELD

The present disclosure is directed to a double check valve. The present disclosure is further directed to a pneumatic braking device and a vehicle, in particular a utility vehicle.

BACKGROUND

Double check valves are known in the form of pneumatic or hydraulic changeover, throttle, or two-pressure valves, usually with two inlets or inlet openings as control ports and one outlet or outlet opening. They are often used in air treatment units of utility vehicles for various control purposes, e.g. for connection and separation of multiple air circuits with compressed air accumulators, as overload protection of components or emergency brake release valves in the supply of compressed air for pneumatic systems, e.g. parking brake systems, service brakes, secondary consumers, clutches and transmissions. Further areas of application are air spring systems and hydraulic flow machines.

A double check valve can usually close in two blocking directions, or by mutual changeover in a respective one of two blocking directions, by way of a spring or pressure force acting in the closing direction, and be opened in a third direction by a flowing fluid which overcomes the closing force at one or both inlets. Closing usually takes place e.g. in that a guide piece is arranged in a respective blocking position in which the guide piece closes one of the inlets. For example, a double check valve may cause the larger of two pressures present at the inlets of the double check valve always to be output at the outlet of the double check valve, or the outlet to be opened only when the larger of the two pressures is present at a specific one of the two inlets, and otherwise blocked.

A known double check valve according to the prior art has a cylindrical sleeve and an elongate, cylindrical guide piece that is inserted so as to be longitudinally movable in the sleeve, and that with its end faces can form two check valves in series acting opposite one another. Such a double check valve is known from DE 10 2017 006 545 A1.

A double check valve according to the prior art works as a function of a pneumatic force and requires an air flow and associated fluid-induced pressure in order to set, maintain and/or change the state of the double check valve in well-defined fashion. Double check valves according to the prior art, however, tend to stick in an intermediate position between the blocking directions, in particular if the pressure level is neutral at the outlet side or similar at the inlets. The inlet openings and outlet opening are then fluidically connected and an uncontrolled overflow occurs. Thus the double check valve does not fulfil its function.

To avoid this problem, the guide piece can be deflected out of the intermediate position by way of a spring force, resulting e.g. from a coil spring or rubber membrane. Typically, a spring force rises e.g. linearly with the deflection. This however leads to the technical problem that, to reach positions remote from the intermediate position, a relatively high return force must be overcome because the guide piece must be deflected relatively far.

SUMMARY

The present disclosure is therefore based on the object of improving the prior art and providing an improved double check valve in which reliable function is guaranteed even under difficult pressure conditions.

This object is achieved by a double check valve according to aspects of the present disclosure. The description herein includes preferred refinements of the present disclosure.

According to the present disclosure, a double check valve includes a sleeve with a longitudinal axis, a first inlet opening, a second inlet opening, and an outlet opening, and a guide piece, wherein the guide piece is arranged movably in the sleeve and is movable along the longitudinal axis in the sleeve by loading with a fluid-induced pressure, wherein the guide piece is movable between a first blocking position and a second blocking position spaced therefrom, wherein each of the inlet openings can be closed at least partly fluid-tightly by the guide piece in one of the blocking positions, wherein in the first blocking position the second inlet opening is opened, and in the second blocking position the first inlet opening is opened, and wherein the double check valve has a permanent magnet, and the guide piece and the permanent magnet are configured to deflect the guide piece, by way of a magnetic force created by the permanent magnet, from an intermediate position arranged between the blocking positions and/or from one of the two blocking positions.

The double check valve according to the present disclosure is thus configured such that in addition to a fluid-induced pressure caused by an air flow, the magnetic force generated by the permanent magnet also acts on the guide piece. The magnetic force acting on the guide piece causes the guide piece to be deflected out of the intermediate position to be avoided, and/or into or out of one of the two blocking positions. A deflection of the guide piece out of the intermediate position implies a deflection of the guide piece towards one of the two blocking positions, whereby a sticking of the guide piece in the intermediate position is suppressed. Deflection of the guide piece out of one of the blocking positions also implies a deflection into the other blocking position.

The present disclosure has found that a magnetic force has a more suitable characteristic for use in a double check valve than a mechanical spring force that is based on elasticity. The amount of the magnetic force falls with the deflection, i.e. with the distance between the guide piece with the permanent magnet and an attraction or repulsion element, e.g. a metallic element, a further permanent magnet, and/or an electromagnet, and/or between the guide piece and the permanent magnet. The magnetic force is optionally repulsive or attractive. Thus the guide piece may be deflected in targeted fashion out of the intermediate position and/or into or out of one of the blocking positions. Also, because of the magnetic force, there is no need to use springs based on elasticity or membranes to avoid sticking of the guide piece in the intermediate position, and/or springs may be designed more simply. This simplifies the construction of the double check valve.

In one aspect, the permanent magnet is arranged between the blocking positions along the longitudinal axis. Thus the permanent magnet is arranged on the sleeve, in a wall of the sleeve, and/or around the sleeve. Optionally, the guide piece comprises a ferromagnetic core, for example of iron and/or steel. Thus the guide piece and permanent magnet are configured to deflect the guide piece, under the magnetic force created by the permanent magnet, in the direction of the permanent magnet, e.g. out of the intermediate position. Optionally, the guide piece contains a permanent magnet so that, depending on deflection of the guide piece, an attractive or repulsive force acts on the guide piece. In one aspect, the permanent magnet arranged on or in a wall of and/or around the sleeve is arranged in the intermediate position in the longitudinal direction, such that a repulsive force acts on the guide piece in the intermediate position. The intermediate position is unstable because of the magnetic repulsion. Thus the intermediate position can be reliably and effectively destabilized. The magnetic force is at a maximum in the intermediate position and falls in the direction of each of the blocking positions. Therefore only a slight magnetic force must be overcome for the guide piece to leave the blocking position, and a gentle deflection of the guide piece out of the blocking position is possible.

In one aspect, the permanent magnet is arranged closer to one of the two blocking positions than to the other of the two blocking positions along the longitudinal axis. Thus the permanent magnet is arranged on the sleeve, in a wall of the sleeve, and/or around the sleeve. In this embodiment, the blocking position close to where the permanent magnet is arranged can be stabilized by an attractive magnetic force. Thus the intermediate position can be destabilized. In this embodiment, the magnetic force close to the blocking position advantageously increases the sealing effect of the guide piece. When a force threshold determined by the magnetic force has been overcome, the guide piece can be reliably deflected out of the blocking position because the magnetic force falls with distance—in contrast to a spring force. Alternatively, the blocking position close to where the permanent magnet is arranged can be destabilized by a repulsive magnetic force. If the permanent magnet is arranged for destabilizing the first blocking position, at the same time the second blocking position is stabilized.

In one aspect, the guide piece contains the permanent magnet. In this embodiment, a particularly versatile design of the double check valve is possible. For example, a ferromagnetic attraction element, e.g. of iron and/or steel, for attracting the guide piece may be arranged around the sleeve, on the sleeve, and/or in a wall of the sleeve, wherein the attraction element causes an attraction of the guide piece. In addition or alternatively, a further permanent magnet may be arranged around the sleeve, on the sleeve, and/or in a wall of the sleeve, wherein the further permanent magnet causes an attraction or repulsion of the guide piece depending on polarization, orientation, and/or depending on deflection of the guide piece. In addition or alternatively, an electromagnet may be arranged around the sleeve, on the sleeve, and/or in a wall of the sleeve, wherein the electromagnet causes an attraction or repulsion of the guide piece depending on orientation, polarization induced by the electrical current, and/or depending on deflection of the guide piece.

In one aspect, the double check valve includes a plurality of permanent magnets in order to be able to adjust the magnetic forces according to the geometry of the double check valve and/or a requirement for the double check valve, such that the intermediate positions are destabilized particularly effectively. For example, two permanent magnets are arranged in the blocking positions along the longitudinal axis and exert an attractive magnetic force on the guide piece. Optionally, also along the longitudinal axis, a further permanent magnet is arranged in the intermediate position and the guide piece contains a permanent magnet, and the permanent magnets in the intermediate position and in the guide piece are arranged so as to exert a repulsive magnetic force on the guide piece. Alternatively, the double check valve includes a plurality of electromagnets. In addition to the arrangement of the electromagnets, the polarization of the electromagnets and hence the effect of the force—attractive or repulsive—can be controlled by a current flowing through the electromagnet. Thus the magnetic force can be set even more flexibly. In a further advantageous embodiment, the double check valve includes one or more permanent magnets and one or more electromagnets, in order to link the effectiveness of a design with permanent magnets with the versatility of a design with electromagnets. The arrangement of a permanent magnet or electromagnet in the intermediate position relative to the longitudinal axis L also means that the respective magnet is arranged on the sleeve, in a wall of the sleeve, and/or around sleeve, such that the magnetic force acting on the guide piece reaches a maximum in the intermediate position, and/or the distance between the guide piece and the magnet is minimal in the intermediate position. The same applies to the arrangement in one of the blocking positions.

In one aspect, the double check valve has one, two, three, or four permanent magnets. One, two, three, or four permanent magnets have the advantage that the double check valve has a simple design but at the same time the intermediate position can be reliably destabilized in many ways.

In one aspect, relative to the longitudinal axis, the permanent magnet is arranged in the intermediate position, in one of the blocking positions, and/or outside the sleeve. Here, the permanent magnet is arranged on the sleeve, in a wall of the sleeve, and/or around the sleeve. In this embodiment, the blocking position at which the permanent magnet is arranged can be stabilized by an attractive magnetic force. Thus the intermediate position is destabilized. Additionally or alternatively, the intermediate position can be destabilized by a repulsive magnetic force.

In one aspect, the permanent magnet is a ring magnet arranged around the sleeve so as to allow an effective arrangement of the permanent magnet. Furthermore, a ring magnet achieves a rotationally symmetrical force. Thus an axial movement of the guide piece is preferred and the guide piece is not excessively pressed against a wall of the sleeve. This avoids an increase in the friction between the guide piece and wall of the sleeve.

According to the present disclosure, a pneumatic braking device includes a double check valve according to the present disclosure. In one aspect, the double check valve of the braking device includes the features described as optional and/or advantageous in order to achieve the associated technical effects.

According to the present disclosure, a vehicle, in particular a utility vehicle, includes a double check valve according to the present disclosure, and/or a braking device according to the present disclosure. In one aspect, the double check valve of the vehicle, in particular a utility vehicle, and/or the braking device, includes the features described as optional and/or advantageous in order to achieve the associated technical effects.

BRIEF DESCRIPTION OF THE DRAWINGS

Further advantages and features of the present disclosure and their technical effects arise from the figures and the description of the preferred embodiments shown in the figures. In the drawings.

DETAILED DISCLOSURE

Figure 1:
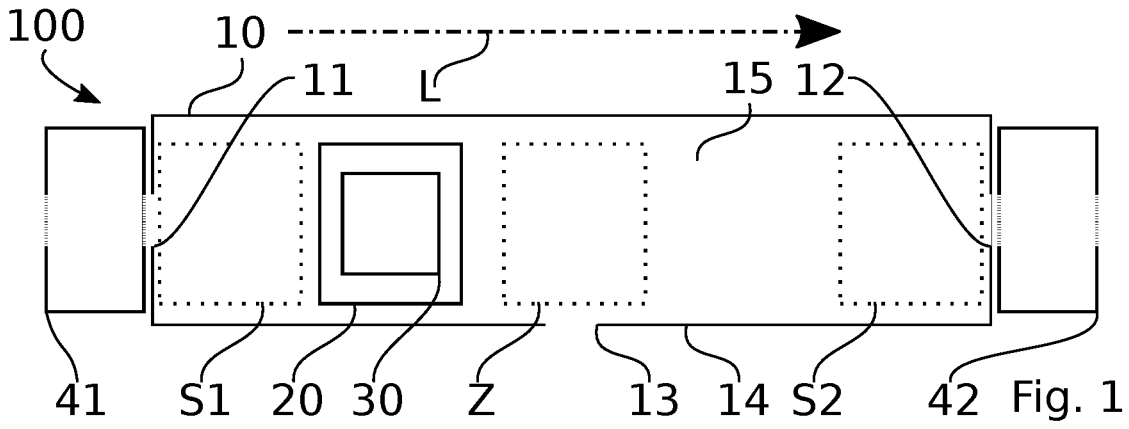
FIG. 1 shows a schematic illustration of a double check valve according to an embodiment of the present disclosure.

FIGS. 1 to 6 each show a schematic illustration of a double check valve 100 according to an embodiment of the present disclosure. Features are described below which are contained in each of the shown embodiments of the double check valve 100.

In each embodiment, the double check valve 100 has a sleeve 10 and a guide piece 20. The sleeve 10 includes a wall 14 and a chamber 15 inside the sleeve 10 and delimited by the wall 14, wherein the guide piece 20 is movably arranged in the sleeve 10. The sleeve 10 has a longitudinal axis L indicated by a dotted line.

The guide piece 20 is a slide. The guide piece 20 is for example made of metal overmolded with a plastic, and optionally includes an O-ring for guiding the guide piece 20.

The sleeve 10 is made of a plastic injection molding, optionally with an inserted holding element of an aluminum diecasting. Optionally, the wall 14 delimiting the chamber 15 has a friction-reducing coating, for example made of PTFE.

The double check valve 100—in these exemplary embodiments, the sleeve 10—has a first inlet opening 11, a second inlet opening 12, and an outlet opening 13. The first inlet opening 11 and the second inlet opening 12 are arranged on opposite sides of the double check valve 100 or sleeve 10 relative to the longitudinal axis L. The outlet opening 13 is arranged between the first inlet opening 11 and the second inlet opening 12. In the schematic illustrations of FIGS. 1 to 6, the inlet openings 11, 12 are arranged on the end faces of the sleeve 10, and the outlet opening 13 on a casing side of the sleeve 10. In other embodiments (not shown), the double check valve 100 has a different arrangement of inlet openings 11, 12 and outlet opening 13.

The guide piece 20 is movable in the sleeve 10 along the longitudinal axis L under loading by a fluid-induced pressure. The guide piece 20 is movable between a first blocking position S1, indicated by a dotted line, and a second blocking position S2, spaced therefrom and also indicated by a dotted line. In particular, the first blocking position S1 and the second blocking position S2 are spaced from one another along the longitudinal axis L. Each of the inlet openings 11, 12 can be closed at least partially fluid-tightly by the guide piece 20 in one of the two blocking positions S1, S2. In the first blocking position S1, the first inlet opening 11 is closed fluid-tightly by the guide piece 20 and in the first blocking position S1 the second inlet opening 12 is open. In the second blocking position S2, the second inlet opening 12 is closed fluid-tightly by the guide piece and in the second blocking position S2 the first inlet opening 11 is open.

An intermediate position Z, indicated by a dotted line, is arranged between the first blocking position S1 and the second blocking position S2. In the intermediate position Z, the guide piece 20 does not block either of the inlet openings 11, 12. Depending on the type of double check valve 100, in the intermediate position Z, the guide piece 20 blocks the outlet opening 13. The embodiments according to the present disclosure prevent the guide piece 20 sticking in the intermediate position Z in that the double check valve 100 has a permanent magnet 30, 31, 32, and/or 33, and the guide piece 20 and permanent magnet 30, 31, 32, and/or 33 are configured to deflect the guide piece 20 out of the intermediate position Z and/or out of one of the blocking positions S1, S2 under a magnetic force created by the permanent magnet 30, 31, 32, and/or 33. In other embodiments (not shown), the double check valve 100 has a different arrangement of blocking positions S1, S2 and the one or more intermediate positions Z.

FIG. 1 shows a schematic illustration of a double check valve 100 according to one embodiment of the present disclosure.

The double check valve 100 has a permanent magnet 30. The guide piece 20 contains the permanent magnet 30.

The double check valve 100 has a first attraction element 41 and a second attraction element 42. The first attraction element 41 and the second attraction element 42 are arranged outside the chamber 15 in which the guide piece 20 is movably arranged. The first attraction element 41 is separated from the second attraction element 42, relative to the longitudinal axis L, by the chamber 15. The first attraction element 41 and the second attraction element 42 are made for example of ferromagnetic metal so as to create a magnetic force between the permanent magnet 30 of the guide piece 20 and the first attraction element 41 or second attraction element 42. The first attraction element 41 creates an attractive magnetic force on the permanent magnet 30 of the guide piece 20, wherein the attractive magnetic force tries to deflect the guide piece 20 into the first blocking position S1. The second attraction element 42 creates an attractive magnetic force on the permanent magnet 30 of the guide piece 20, wherein the attractive magnetic force tries to deflect the guide piece 20 into the second blocking position S2. Thus a sticking of the guide piece 20 in the intermediate position Z can be avoided, because the intermediate position Z is destabilized by the magnetic forces acting in the direction of the first blocking position S1 and the second blocking position S2. In this embodiment, the polarization p1, p2 of the permanent magnet 30 is not shown.

The first attraction element 41 and the second attraction element 42 are configured and arranged such that the first inlet opening 11 and second inlet opening 12 can be opened. For example, the first attraction element 41 and the second attraction element 42 have a recess and/or opening that does not close the respective inlet opening 11, 12. The first attraction element 41 and the second attraction element 42 are for example annular or hollow cylindrical metal elements.

Figure 2:
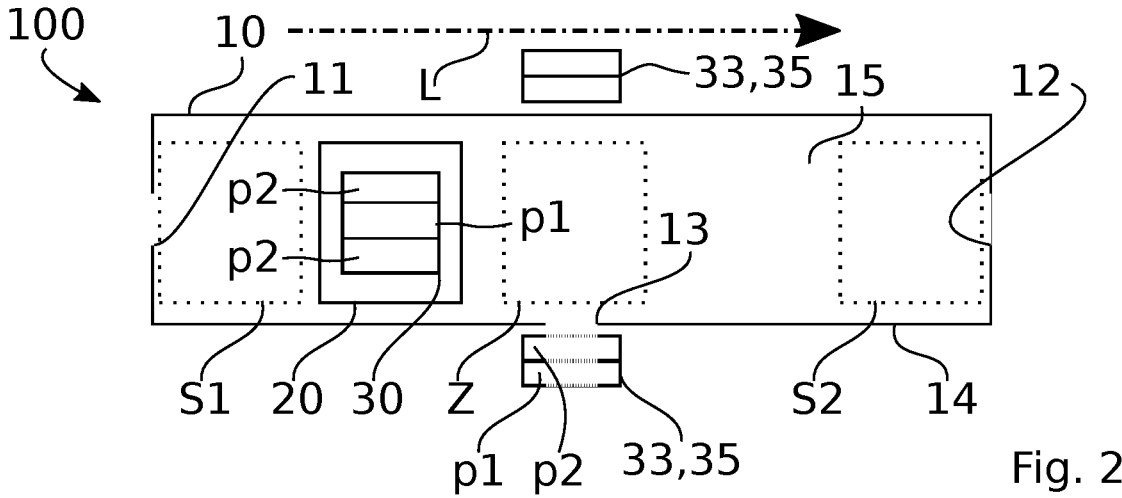
FIG. 2 shows a schematic illustration of a double check valve according to a further embodiment of the present disclosure.

FIG. 2 shows a schematic illustration of a double check valve 100 according to a further embodiment of the present disclosure.

The double check valve 100 of FIG. 2 has two permanent magnets 30, 33, i.e. a plurality of permanent magnets 30, 33. The guide piece 20 contains a permanent magnet 30. A further permanent magnet 33 is arranged between the blocking positions S1, S2 along the longitudinal axis L, wherein the further permanent magnet 33 is a ring magnet 35 arranged around the sleeve 10. The permanent magnet 33 arranged around the sleeve 10 is arranged at the intermediate position Z.

The permanent magnet 30 contained by the guide piece 20 has a first pole p1 and a second pole p2. For example, the permanent magnet 30 contained by the guide piece 20 is a cylindrical magnet with the first pole p1 in an inner cylinder portion and the second pole p2 in an outer cylinder portion. The first pole p1 is arranged radially inside the second pole p2. The first pole p1 is arranged between the second poles p2 in a direction perpendicular to the longitudinal axis L.

The permanent magnet 33 arranged around the sleeve 10 has a first pole p1 and a second pole p2. The second pole p2 is arranged facing the sleeve 10 and hence inside the first pole p1 in a direction perpendicular to the longitudinal axis L.

Because of the arrangement of the permanent magnets 30, 33 and their poles p1, p2, a repulsive magnetic force MR acts between the guide piece 20, or permanent magnet 30 of the guide piece 20, and the permanent magnet 33 arranged around the sleeve 10. Thus the intermediate position Z is reliably destabilized. The arrangement of the further permanent magnet 33 around the sleeve 10 implies that the repulsive magnetic force MR acting on the permanent magnet 30 of the guide piece 20 is at a maximum in the intermediate position Z. The repulsive magnetic force MR is indicated schematically in FIG. 6 by a dotted line.

The permanent magnet 33 is configured and arranged such that the outlet opening 13 can be opened. In an embodiment, the permanent magnet 33 arranged around the sleeve 10 includes a plurality of permanent magnets advantageously evenly distributed around the sleeve 10.

Figure 3:
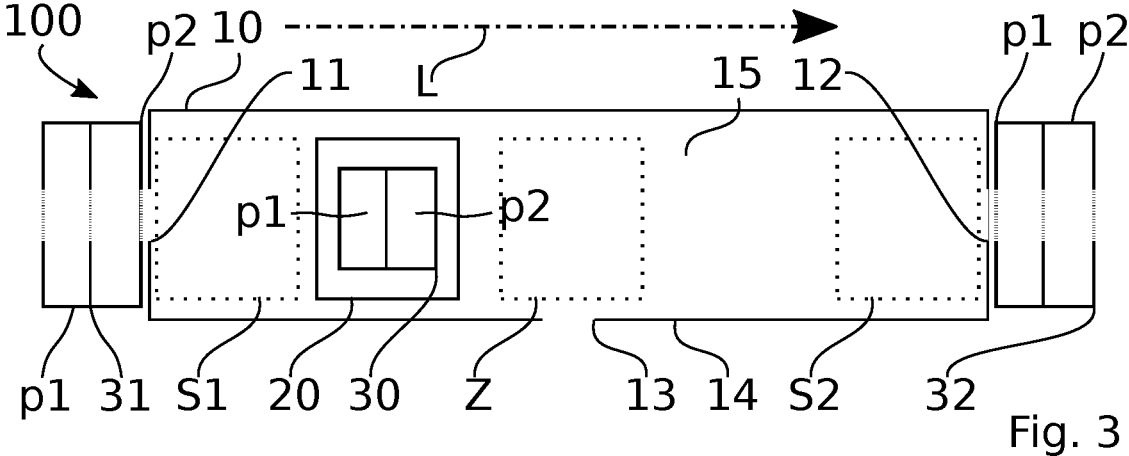
FIG. 3 shows a schematic illustration of a double check valve according to a further embodiment of the present disclosure.

FIG. 3 shows a schematic illustration of a double check valve 100 according to a further embodiment of the present disclosure.

The double check valve 100 of FIG. 3 has three permanent magnets 30, 31, 32, i.e. a plurality of permanent magnets 30, 31, 32. The guide piece 20 includes a permanent magnet 30. Each further permanent magnet 31, 32 is arranged outside the chamber 15 in which the guide piece 20 is movably arranged. One of the further permanent magnets 31 is separated from the other of the further permanent magnets 32 relative to the longitudinal axis L by the chamber 15.

The further permanent magnets 31, 32 are each arranged along the longitudinal axis L closer to one of the two blocking positions S1, S2 than the other of the two blocking positions S1, S2. A first of the further permanent magnets 31 is arranged closer to the first blocking position S1 than the second blocking position S2. A second of the further permanent magnets 32 is arranged closer to the second blocking position S2 than the first blocking position S1. The first further permanent magnet 31 and the second further permanent magnet 32 are arranged outside the sleeve 10 relative to the longitudinal axis L.

Each of the further permanent magnets 31, 32 has a first pole p1 and a second pole p2. The permanent magnet 30 contained by the guide piece 20 has a first pole p1 and a second pole p2. The first pole p1 of the permanent magnet 30 contained by the guide piece 20 is arranged, relative to the longitudinal axis L, closer to the first further permanent magnet 31 than to the second further permanent magnet 32. The second pole p2 of the permanent magnet 30 contained by the guide piece 20 is arranged, relative to the longitudinal axis L, closer to the second further permanent magnet 32 than to the first further permanent magnet 31.

In the embodiment shown, the second pole p2 of the first further permanent magnet 31 faces the first pole p1 of the permanent magnet 30 contained by the guide piece 20. Thus an attractive magnetic force acts between the first further permanent magnet 31 and the permanent magnet 30 contained by the guide piece 20. This achieves a simplified deflection of the guide piece 20 towards the first blocking position S1. The first pole p1 of the second further permanent magnet 32 faces the second pole p2 of the permanent magnet 30 contained by the guide piece 20. Thus an attractive magnetic force acts between the second further permanent magnet 31 and the permanent magnet 30 contained by the guide piece 20. This achieves a simplified deflection of the guide piece 20 towards the second blocking position S2. Thus the first blocking position S1 and the second blocking position S2 are stabilized and the intermediate position Z is destabilized. Each of the further permanent magnets 31, 32 causes a deflection of the guide piece 20 out of the intermediate position Z.

In one embodiment, the further permanent magnets 31, 32 are arranged in the blocking positions S1, S2 relative to the longitudinal axis L, for example as the ring magnet 35 surrounding the sleeve 10 at the blocking positions S1, S2. In one embodiment, the polarity of the further permanent magnets 31, 32 or one of the further permanent magnets 31, 32 is reversed, whereby a repulsive magnetic force is created which repels the guide piece 20 from the further permanent magnet(s) 31, 32 in order to destabilize the respective blocking position S1, S2.

Advantageously, the embodiments of FIGS. 2 and 3 may be combined, in that for example the embodiment of the double check valve 100 shown in FIG. 3 has a permanent magnet 33, described with reference to FIG. 2, which is arranged in the intermediate position Z along the longitudinal axis L, wherein the permanent magnet 33 has two different poles p1, p2 relative to the longitudinal axis L. A double check valve 100 according to such an embodiment has four permanent magnets 30, 31, 32, 33.

Figure 4:
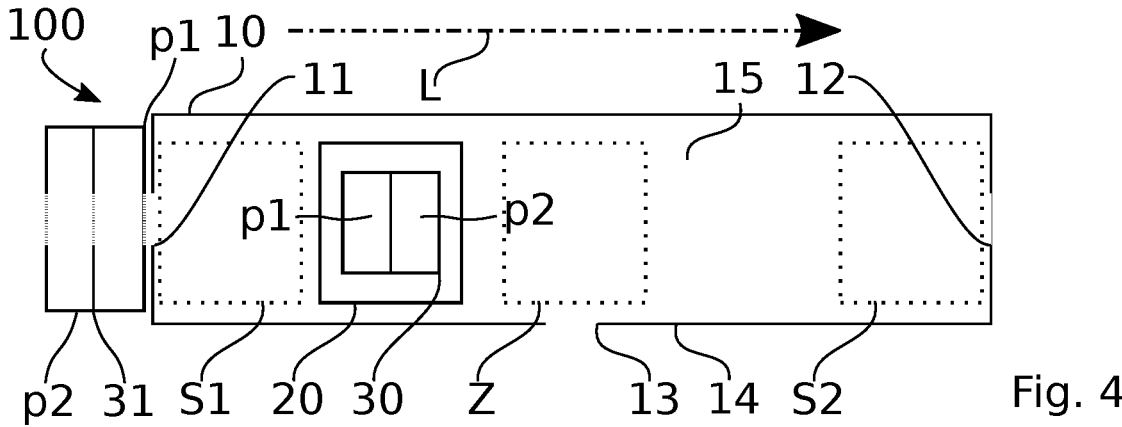
FIG. 4 shows a schematic illustration of a double check valve according to a further embodiment of the present disclosure.

FIG. 4 shows a schematic illustration of a double check valve 100 according to a further embodiment of the present disclosure.

The double check valve 100 of FIG. 4 has two permanent magnets 30, 31, i.e. a plurality of permanent magnets 30, 31. The guide piece 20 includes a permanent magnet 30. A further permanent magnet 31 is arranged outside the chamber 15 in which the guide piece 20 is movably arranged.

The further permanent magnet 31 is arranged closer to the first blocking position S1 than the second blocking position S2. The further permanent magnet 31 is arranged outside the sleeve 10 relative to the longitudinal axis L.

The further permanent magnet 31 has a first pole p1 and a second pole p2. The permanent magnet 30 contained by the guide piece 20 has a first pole p1 and a second pole p2. The first pole p1 of the permanent magnet 30 contained by the guide piece 20 is arranged, relative to the longitudinal axis L, closer to the further permanent magnet 31 than the second pole p2 of the permanent magnet 30 contained by the guide piece 20.

In the embodiment shown, the first pole p1 of the further permanent magnet 31 faces the first pole p1 of the permanent magnet 30 contained by the guide piece 20. Thus a repulsive magnetic force acts between the further permanent magnet 31 and the permanent magnet 30 contained by the guide piece 20. This achieves a simplified deflection of the guide piece 20 out of the first blocking position S1 towards the second blocking position S2. In any case, the symmetry of the magnetic force relative to the longitudinal axis L is thus broken. So the second blocking position S2 is stabilized and the intermediate position Z is destabilized. Alternatively, the polarization of the further permanent magnet 31 or the permanent magnet 30 contained by the guide piece 20 may be reversed, in order to create an attractive force between the further permanent magnet 31 and the guide piece 20.

Advantageously, the embodiments of FIGS. 2 and 4 may be combined, in that for example the embodiment of the double check valve 100 shown in FIG. 4 contains a permanent magnet 33, described according to FIG. 2, which is arranged in the intermediate position Z relative to the longitudinal axis L, wherein the permanent magnet 33 has two different poles p1, p2 relative to the longitudinal direction L.

Figure 5:
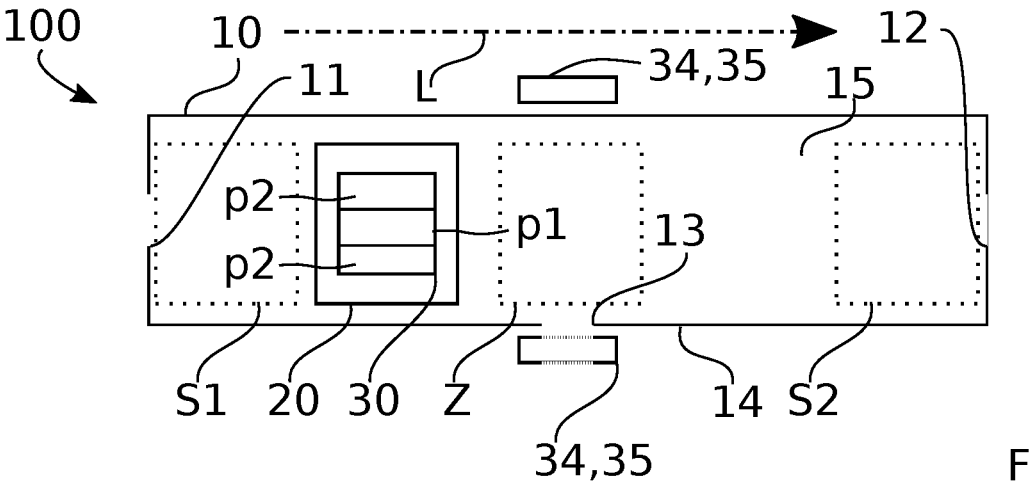
FIG. 5 shows a schematic illustration of a double check valve according to a further embodiment of the present disclosure.

FIG. 5 shows a schematic illustration of a double check valve 100 according to a further embodiment of the present disclosure.

The double check valve 100 of FIG. 5 has a permanent magnet 30. The guide piece 20 contains the permanent magnet 30, as described with reference to FIG. 2.

The double check valve 100 of FIG. 5 includes an electromagnet 34. The electromagnet 34 is arranged between the blocking positions S1, S2 along the longitudinal axis L. The electromagnet 34 is arranged in the intermediate position Z. The electromagnet 34 is a ring magnet 35 arranged around the sleeve 10. The electromagnet 34 is configured and arranged such that the outlet opening 13 can be opened.

The polarization of the electromagnet 34 can be switched by loading the electromagnet 34 with a correspondingly oriented electrical current. In particular, the polarization of the electromagnet 34 can be switched such that a repulsive magnetic force acts between the electromagnet 34 and the permanent magnet 30 contained by the guide piece 20. Thus the intermediate position Z is destabilized.

In an alternative embodiment, each of the permanent magnets 31, 32, 33 arranged outside the chamber 15 of the sleeve 10, and described with reference to FIGS. 2 to 4, may be replaced by an electromagnet 34. Thus the polarization can be changed to enable targeted switching between an attractive magnetic force and a repulsive magnetic force.

Figure 6:
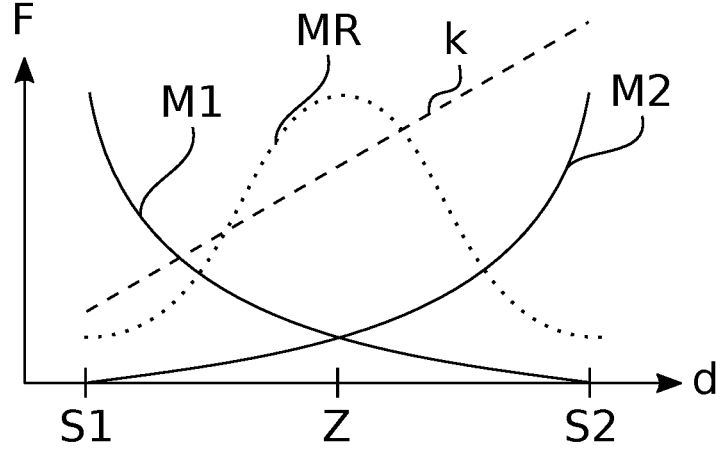
FIG. 6 shows a schematic illustration of a force acting on a guide piece of a double check valve.

FIG. 6 is a schematic illustration of a force F acting on a guide piece 20 of a double check valve 100. FIG. 6 illustrates schematically the correlation between the force F acting on the guide piece 20 and the deflection d of the guide piece 20.

The correlation illustrated by a dotted line represents the correlation between the force F acting on the guide piece 20 and the deflection d of the guide piece 20 according to the prior art, wherein a spring-loaded double check valve 100 has a spring having a rest position in the first blocking position S1. In the first blocking position S1, a spring force k implied by the spring is minimal. On deflection of the guide piece 20 in the direction of the second blocking position S2, the spring force k rises proportionally with the deflection d of the guide piece 20 out of the first blocking position S1, i.e. with the distance between the first blocking position S1 and the guide piece 20. As the deflection d increases, the spring tries ever harder to deflect the guide piece 20 in the direction of the first blocking position S1.

The correlations illustrated by the continuous lines each represent the correlation between the force F acting on the guide piece 20 and the deflection d of the guide piece 20 according to the present disclosure, wherein for illustrating the curve of a first magnetic force M1, the double check valve 100 has a magnet arrangement according to the present disclosure which creates an attractive magnetic force in the direction of the first blocking position S1, and wherein for illustrating the curve of a second magnetic force M2, the double check valve 100 has a magnet arrangement according to the present disclosure which creates an attractive magnetic force in the direction of the second blocking position S2. The first magnetic force M1 and second magnetic force M2 are maximal in the first blocking position S1 and second blocking position S2. The blocking positions S1, S2 are thus stabilized and the intermediate position Z is destabilized. On deflection of the guide piece 20 in the direction of the second blocking position S2, the first magnetic force M1 falls with the deflection d of the guide piece 20 out of the first blocking position S1, and the second magnetic force M2 increases with the deflection d of the guide piece 20 out of the first blocking position S1. In the intermediate position Z, the magnetic forces M1, M2 compensate for one another. On only minimal deflection d of the guide piece 20 out of the intermediate position Z, one of the magnetic forces M1, M2 prevails and the guide piece 20 is accordingly deflected further out of the intermediate position Z.

The dotted line shows the correlation between the force F acting on the guide piece 20, here a repulsive magnetic force MR, and the deflection d of the guide piece 20 according to the embodiment of FIG. 2. In this embodiment, the force effect is maximal in the intermediate position Z and falls away towards the two blocking positions S1, S2 with a course of a bell curve.

Figure 7:
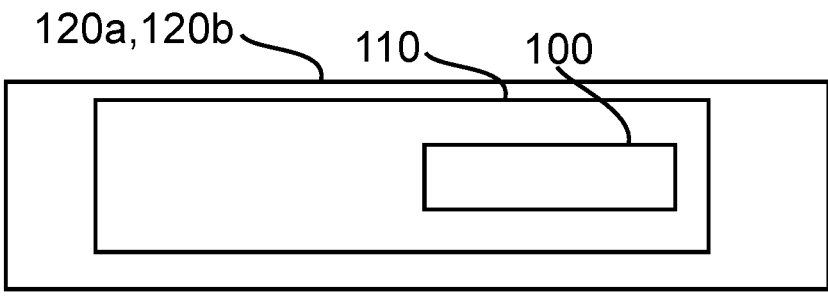
FIG. 7 shows a schematic illustration of a vehicle, in particular a utility vehicle, according to an embodiment of the present disclosure.

FIG. 7 shows a schematic illustration of a vehicle 120a, in particular a utility vehicle 120b, according to an embodiment of the present disclosure.

The vehicle 120a, in particular the utility vehicle 120b, includes a pneumatic braking device 110. The pneumatic braking device 110 includes a double check valve 100 as described with reference to FIGS. 1 to 6.

The braking device 110 is here any pneumatic braking device 110 which includes the double check valve 100 as a logic component and/or a dual input separator.

LIST OF REFERENCE PARTS (PART OF DESCRIPTION)

10 Sleeve
11 First inlet opening
12 Second inlet opening
13 Outlet opening
14 Wall
15 Chamber
20 Guide piece
30 Permanent magnet of guide piece
31 Permanent magnet
32 Permanent magnet
33 Permanent magnet
34 Electromagnet
35 Ring magnet
41 First attraction element
42 Second attraction element
100 Double check valve
110 Pneumatic braking device
120a Vehicle
120b Utility vehicle
d Deflection
F Force
k Spring force (prior art)
M1 First magnetic force
M2 Second magnetic force
MR Repulsive magnetic force
L Longitudinal axis
p1 First pole
p2 Second pole
S1 First blocking position
S2 Second blocking position
Z Intermediate position
What is claimed is:

1. A double check valve (100), comprising: a sleeve (10) with a longitudinal axis (L), a first inlet opening (11), a second inlet opening (12), and an outlet opening (13), and a guide piece (20), wherein the guide piece (20) is arranged movably in the sleeve (10) and is movable along the longitudinal axis (L) in the sleeve (10) by loading with a fluid-induced pressure, wherein the guide piece (20) is movable between a first blocking position (S1) and a second blocking position (S2) spaced therefrom, wherein each of the inlet openings (11, 12) is closed at least partly fluid-tightly by the guide piece (20) in one of the blocking positions (S1, S2), wherein in the first blocking position (S1) the second inlet opening (12) is opened, and in the second blocking position (S2) the first inlet opening (11) is opened, and at least one fixed magnet, wherein the at least one fixed magnet includes at least one permanent magnet or at least one electromagnet, wherein the guide piece (20) includes a moveable permanent magnet (30), and the at least one fixed magnet deflects the guide piece (20), by way of a magnetic force created by the at least one fixed magnet, from an intermediate position (Z) arranged between the blocking positions (S1,S2) or toward one of the two blocking positions (S1, S2); wherein the guide piece is configured such that, in addition to said fluid-induced pressure and when the magnetic force created by the at least one fixed magnet also acts on the moveable permanent magnet of the guide piece, the magnetic force combined with the fluid-induced pressure define a combined force that causes the guide piece to be deflected out of the intermediate position (Z) arranged between the blocking positions (S1, S2) or toward one of the two blocking positions (S1, S2); wherein the fluid-induced pressure is a pneumatic pressure; wherein the pneumatic pressure is received at both the first inlet opening and the second inlet opening; wherein the fluid-induced pressure and the magnetic force combine such that the guide piece does not stick in the intermediate position, wherein a correlation between the combined force acting on the guide piece and the deflection of the guide piece is non-linear; and wherein the guide piece and the permanent magnet are fixed relative to each other and move relative to the sleeve and the at least one fixed magnet.

2. The double check valve according to claim 1, wherein the at least one fixed magnet is arranged closer to one of the two blocking positions (S1, S2) than to the other of the two blocking positions (S1, S2) along the longitudinal axis (L).

3. The double check valve according to claim 1, wherein the at least one fixed magnet and the moveable permanent magnet (30) combine to define a plurality of permanent magnets.

4. The double check valve according to claim 3, wherein a total quantity of the plurality of permanent magnets is two, three or four permanent magnets.

5. The double check valve according to claim 1, wherein relative to the longitudinal axis (L), the at least one fixed magnet is arranged outside the sleeve (10) and is a permanent magnet arranged in the intermediate position (Z) or in one or both of the blocking positions (S1, S2).

6. The double check valve according to claim 1, wherein the at least one fixed magnet is a first permanent magnet arranged and fixed at the first blocking position and a second permanent magnet arranged and fixed at the second blocking position.

7. The double check valve according to claim 6, wherein the moveable permanent magnet of the guide piece is a further permanent magnet and includes a first pole and second pole, wherein the first pole of the further permanent magnet is arranged closer to the first blocking position than the second blocking position, wherein the first permanent magnet that is fixed and arranged at the first blocking position has a first pole and a second pole, wherein the second pole of the first permanent magnet is arranged closer to the guide piece than the first pole of the first permanent magnet, wherein the second permanent magnet that is fixed and arranged at the second blocking position has a first pole and a second pole, wherein the first pole of the second permanent magnet is arranged closer to the guide piece than the second pole of the second permanent magnet.

8. The double check valve according to claim 1, wherein, when the guide piece is in a shifted position that is closer to the first blocking position, a magnetic force generated by the at least one fixed magnet that is applied to the guide piece in a direction toward the first blocking position overcomes the magnetic force that is applied to the guide piece in a direction toward the second blocking position, such that the guide piece is urged toward the first blocking position.

9. The double check valve according to claim 1, wherein the guide piece is magnetically destabilized from the intermediate position.

10. The double check valve according to claim 1, wherein the guide piece is magnetically stabilized toward one or more of the blocking positions.

11. The double check valve according to claim 1, wherein the at least one fixed magnet includes a first electromagnet and a second electromagnet arranged and fixed at the first and second blocking positions, respectively.

12. The double check valve according to claim 1, wherein the at least one fixed magnet and the sleeve are fixed relative to each other.

13. A pneumatic braking device (110) comprising: a first pneumatic pressure line that transmits a first pneumatic pressure; a second pneumatic pressure line that transmits a second pneumatic pressure; a third pneumatic pressure line that transmits an outgoing pneumatic pressure; a double check valve (100), the double check valve comprising: a sleeve (10) with a longitudinal axis (L), a first inlet opening (11), a second inlet opening (12), and an outlet opening (13), wherein the first inlet opening (11) is connected to the first pneumatic pressure line and receives the first pneumatic pressure, wherein the second inlet opening (12) is connected to the second pneumatic pressure line and receives the second pneumatic pressure, wherein the outlet opening (13) is connected to the third pneumatic pressure line and transmits the outgoing pneumatic pressure; a guide piece (20), wherein the guide piece (20) is arranged movably in the sleeve (10) and is movable along the longitudinal axis (L) in the sleeve (10) by loading with a fluid-induced pressure, wherein the fluid-induced pressure includes the first and second pneumatic pressures, wherein the guide piece (20) is movable between a first blocking position (S1) and a second blocking position (S2) spaced therefrom, wherein each of the inlet openings (11, 12) is closed at least partly fluid-tightly by the guide piece (20) in one of the blocking positions (S1, S2), wherein in the first blocking position (S1) the second inlet opening (12) is opened, and in the second blocking position (S2) the first inlet opening (11) is opened, and at least one fixed magnet, wherein the at least one fixed magnet includes at least one permanent magnet or at least one electromagnet, wherein the guide piece (20) includes a moveable permanent magnet (30), and the at least one fixed magnet deflects the guide piece (20), by way of a magnetic force created by the at least one fixed magnet, from an intermediate position (Z) arranged between the blocking positions (S1, S2) or toward one of the two blocking positions (S1, S2); wherein the guide piece is configured such that, in addition to said fluid-induced pressure and when the magnetic force created by the at least one fixed magnet also acts on the moveable permanent magnet of the guide piece, the magnetic force combined with the fluid-induced pressure causes the guide piece to be deflected out of the intermediate position (Z) arranged between the blocking positions (S1, S2) or toward one of the two blocking positions (S1, S2); wherein the at least one fixed magnet and the sleeve are fixed relative to each other; wherein the sleeve is fixed relative to the pneumatic pressure lines; wherein the guide piece and permanent magnet are fixed relative to each other and move relative to the sleeve between the blocking positions.

14. A vehicle (120a) having a braking device (110) according to claim 13.

15. A double check valve (100), comprising:

a sleeve (10) with a longitudinal axis (L), a first inlet opening (11), a second inlet opening (12), and an outlet opening (13), and a guide piece (20), wherein the guide piece (20) is arranged movably in the sleeve (10) and is movable along the longitudinal axis (L) in the sleeve (10) by loading with a fluid-induced pressure, wherein the guide piece (20) is movable between a first blocking position (S1) and a second blocking position (S2) spaced therefrom, wherein each of the inlet openings (11, 12) is closed at least partly fluid-tightly by the guide piece (20) in one of the blocking positions (S1, S2), wherein in the first blocking position (S1) the second inlet opening (12) is opened, and in the second blocking position (S2) the first inlet opening (11) is opened, and at least one fixed magnet, wherein the at least one fixed magnet includes at least one permanent magnet or at least one electromagnet, wherein the guide piece (20) includes a moveable permanent magnet (30), and the at least one fixed magnet deflects the guide piece (20), by way of a magnetic force created by the at least one fixed magnet, from an intermediate position (Z) arranged between the blocking positions (S1, S2) or toward one of the two blocking positions (S1, S2);

wherein the guide piece is configured such that, in addition to said fluid-induced pressure and when the magnetic force created by the at least one fixed magnet also acts on the moveable permanent magnet of the guide piece, the magnetic force combined with the fluid-induced pressure define a combined force that causes the guide piece to be deflected out of the intermediate position (Z) arranged between the blocking positions (S1, S2) or toward one of the two blocking positions (S1, S2);

wherein the fluid-induced pressure is a pneumatic pressure;

wherein the pneumatic pressure is received at both the first inlet opening and the second inlet opening;

wherein the fluid-induced pressure and the magnetic force combine such that the guide piece does not stick in the intermediate position, wherein a correlation between the combined force acting on the guide piece and the deflection of the guide piece is non-linear;

wherein the at least one fixed magnet and the sleeve are fixed relative to each other; and wherein the guide piece and permanent magnet are fixed relative to each other and move relative to the sleeve and the at least one fixed magnet;

wherein the at least one fixed magnet is not part of the guide piece that moves relative to the sleeve;

wherein the permanent magnet that moves with the guide piece is not part of the sleeve.

* * * * *